United States Patent [19]

Abbott

[11] 4,304,618
[45] Dec. 8, 1981

[54] METHOD OF MANUFACTURING RADIAL TIRE CARCASS EMPLOYING A RESTRICTING MEMBER

[75] Inventor: John R. Abbott, Cuyahoga Falls, Ohio

[73] Assignee: The Goodyear Tire & Rubber Company, Akron, Ohio

[21] Appl. No.: 125,419

[22] Filed: Feb. 28, 1980

[51] Int. Cl.³ ................... B60C 11/02; B60C 9/20
[52] U.S. Cl. ........................ 156/123 R; 156/133; 264/315; 264/326; 152/176; 152/188; 152/209 R; 152/361 R
[58] Field of Search ............. 156/95, 96, 123, 124, 156/126–129, 133; 152/175, 176, 185, 187–188, 209, 361; 264/326, 315, 501–502

[56] References Cited

U.S. PATENT DOCUMENTS

| | | | |
|---|---|---|---|
| 844,820 | 2/1907 | Marks | 156/128 R |
| 1,678,211 | 7/1928 | Davidson | 152/352 |
| 2,884,044 | 4/1959 | Hulswit | 156/128 R |
| 2,985,214 | 5/1961 | Lugli | 152/361 R |
| 2,996,098 | 8/1961 | Lyon | 152/361 R |
| 3,123,122 | 3/1964 | Beckadolph | 152/361 R |
| 3,218,209 | 11/1965 | Travers et al. | 156/127 |
| 3,224,482 | 12/1965 | Barassi et al. | 152/361 R |
| 3,294,143 | 12/1966 | Frazier | 156/133 |
| 3,392,072 | 7/1968 | Alderfer | 152/127 |
| 3,422,874 | 1/1969 | Weitzel | 156/110 R |
| 3,464,873 | 9/1969 | Hawilinson | 156/126 R |
| 3,533,898 | 10/1970 | Bezbatchenko | 152/361 R |
| 3,616,132 | 10/1971 | Klingbeil | 156/123 |
| 3,964,949 | 6/1976 | Kent et al. | 156/128 R |
| 4,092,196 | 5/1978 | Miller et al. | 156/123 R |
| 4,152,191 | 5/1979 | Olsen | 156/127 |
| 4,202,394 | 5/1980 | Van Der Burg | 152/361 R |
| 4,218,277 | 8/1980 | Van Der Burg | 156/96 |

FOREIGN PATENT DOCUMENTS 808824 2/1959 United Kingdom ............. 152/361 R

Primary Examiner—Edward C. Kimlin
Assistant Examiner—Lois E. Boland
Attorney, Agent, or Firm—J. C. Simmons

[57] ABSTRACT

A pneumatic radial tire is made by applying a restricting member circumferentially around a cylindrical radial tire carcass. Shaping pressure inflates the carcass to a toroidal shape having a section height less than a predetermined section height so that the carcass can be enclosed by a mold for vulcanization. After vulcanization, normal inflation pressure is sufficient to further expand the restricting member and carcass to a shape having a section height greater than the predetermined section height so that the carcass may be pressed into gripping engagement with a replaceable tread belt.

5 Claims, 4 Drawing Figures

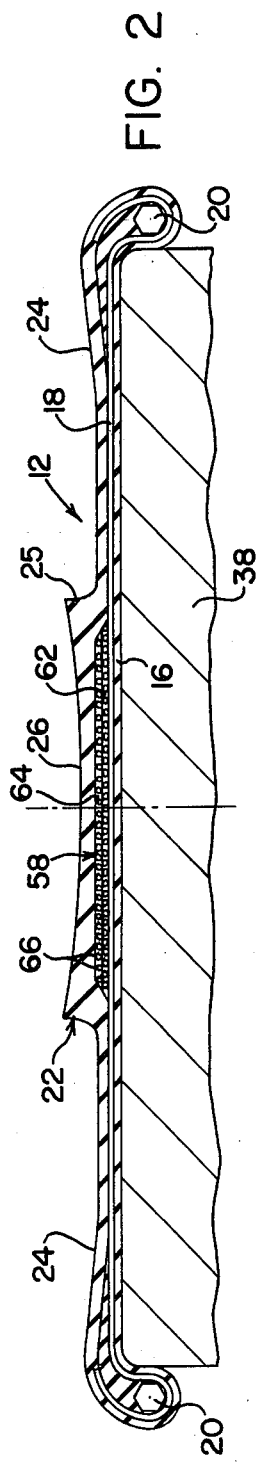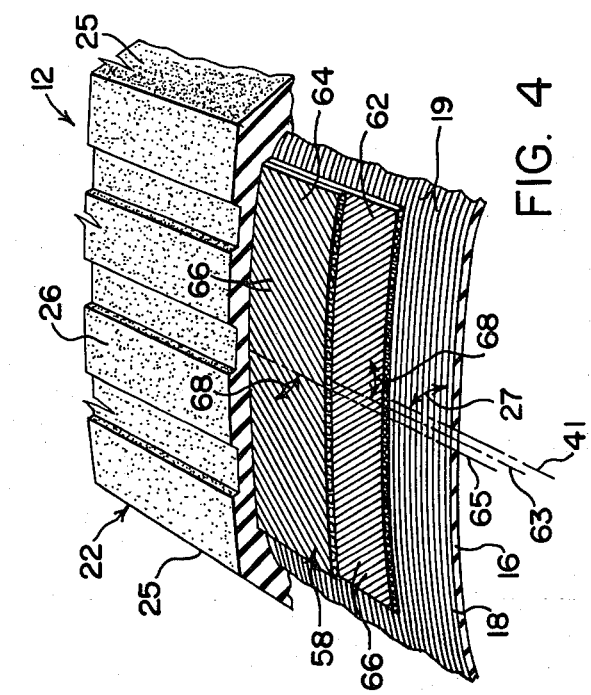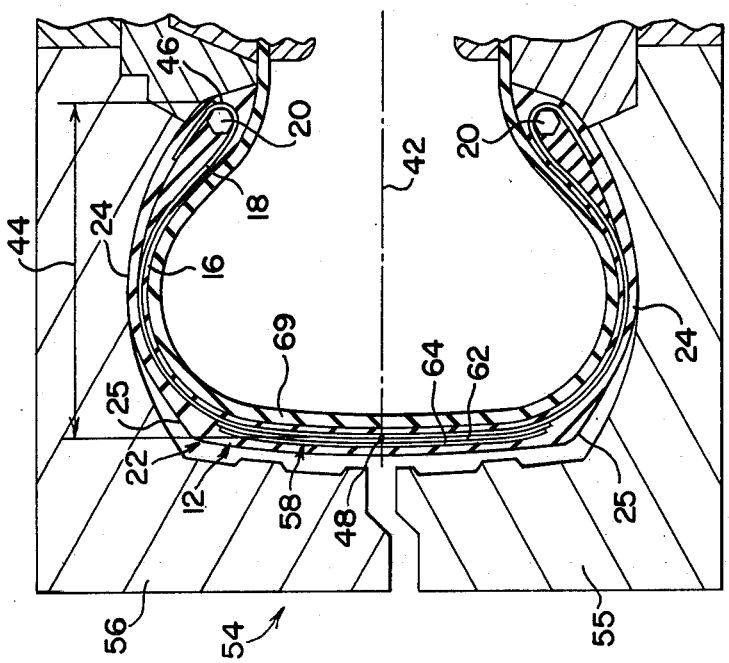

METHOD OF MANUFACTURING RADIAL TIRE CARCASS EMPLOYING A RESTRICTING MEMBER

This invention relates to a radial tire carcass for a tire with a replaceable tread belt and to a method useful for building the carcass so that it can be vulcanized in a two-piece mold.

When radial tire carcasses without any circumferential restriction are expanded from a generally cylindrical form to a toroidal shape for curing, they naturally assume an aspect ratio of about 1.06. Even a very low shaping pressure of five or six pounds per square inch will cause the carcass to assume a shape with such an aspect ratio. It may be desirable, however, to build tires of the replaceable tread belt type having aspect ratios substantially less than 1.06.

To enclose a tire carcass in a two-piece mold for curing, it is necessary that the carcass be partially shaped to a shape with a section height less than the predetermined section height (corresponding to the desired aspect ratio) of the tire carcass in the molded condition. Otherwise, the carcass will not fit into the mold properly and distortion of the carcass such as wrinkling may occur during closing of the two-piece mold. When the partially shaped carcass is placed in the two-piece mold and the mold closed, then the carcass may be further expanded to complete the shaping within the mold.

The two-piece mold is normally designed for vulcanizing a tire having the desired aspect ratio; however, since even a relatively low shaping pressure will expand the radial carcass to a size having an aspect ratio of about 1.06, the application of a normal shaping pressure will result in the section height of the carcass, if otherwise unrestricted, being too large for enclosure in the two-piece mold. Although restriction of expansion is needed during shaping, the cured carcass should not be restricted from expansion to a size having an aspect ratio greater than that of the molded tire. This will allow normal inflation pressure to expand the tire carcass into gripping engagement with the replaceable tread belt to prevent slippage between the carcass and tread belt which otherwise results from driving or braking torque.

The tire construction of an aspect of this invention provides a restricting member which allows shaping of the carcass to a generally toroidal shape but restricts expansion of the carcass to a shape having a section height less than a predetermined section height of the molded tire carcass to permit enclosure of a mold about the shaped carcass. To allow forces resulting from normal inflation pressure to be transferred to the tread belt when mounted on the carcass, the restricting member has insufficient strength under normal inflation pressures to prevent the carcass from expanding to a shape where the section height is greater than the predetermined section height of the molded tire.

In accordance with one aspect of the invention, there is provided a method of making a radial tire carcass for a replaceable tread belt tire comprising building a generally cylindrical unvulcanized tire carcass of elastomeric material including a pair of beads and at least one radial ply of reinforcing cords extending between said beads; wrapping a restricting member circumferentially around said carcass, the strength of said restricting member being such as to limit expansion of said carcass to a toroidal shape having a section height less than a predetermined section height of said tire in the molded condition when a predetermined shaping pressure is applied to said carcass; partially shaping said carcass to a generally toroidal shape having a section height less than said predetermined section height by inflating said carcass at said predetermined shaping pressure; enclosing a mold about the partially shaped unvulcanized tire carcass; applying pressure greater than said shaping pressure to the unvulcanized tire carcass within the mold to complete the shaping of the tire carcass to a shape having said predetermined section height within the mold, said restricting member having insufficient strength to prevent expansion of said carcass to a shape having a section height greater than said predetermined section height at the normal inflation pressure of the tire; vulcanizing the tire carcass in the mold; and removing the tire carcass from the mold.

In accordance with another aspect of this invention, there is provided a radial tire carcass for use with a replaceable tread belt comprising a generally toroidal body of resilient material having a pair of beads, a crown portion, and a pair of sidewalls extending radially inward from said crown portion to said beads, a plurality of generally radial reinforcing cords extending between said beads, a restricting member extending circumferentially around said carcass radially outward of said radial reinforcing cords, said restricting member having sufficient strength to prevent expansion of said carcass to a shape having a section height greater than a predetermined section height during shaping of said tire carcass from a cylindrical shape to a toroidal shape when inflated by a predetermined shaping pressure for placing of said carcass in a two-piece mold, said restricting member having insufficient strength to prevent expansion of said carcass to a shape having a section height greater than said predetermined section height when normal tire inflation pressure is applied to the carcass.

In accordance with yet another aspect of the invention, there is provided a radial tire comprising a generally toroidal body of resilient material having a pair of beads, a crown portion, and a plurality of sidewalls extending radially inward from said crown portion to said beads, a plurality of generally radial reinforcing cords extending between said beads, a restricting member extending circumferentially around said carcass radially outward of said radial reinforcing cords, a replaceable tread belt extending circumferentially around said crown portion, said restricting member having sufficient strength to prevent expansion of said carcass beyond a predetermined section height during shaping of said tire carcass from a cylindrical shape to a toroidal shape when inflated at a predetermined shaping pressure for placing of said carcass in a two-piece mold, said restricting member having insufficient strength to prevent expansion of said carcass beyond said predetermined section height when normal operating tire inflation pressure is applied to the carcass.

In the drawings:

FIG. 2 is a partial cross-sectional view taken in a radial plane of the tire carcass shown in FIG. 1 in a cylindrical shape prior to shaping.

FIG. 3 is a partial cross-sectional view taken in a radial plane of the tire carcass shown in FIG. 1 in toroidal shape and partially enclosed by the pieces of a two-piece mold.

FIG. 4 is a fragmentary perspective view with parts broken away of a tire carcass constructed in accordance with this invention.

Figure 1:
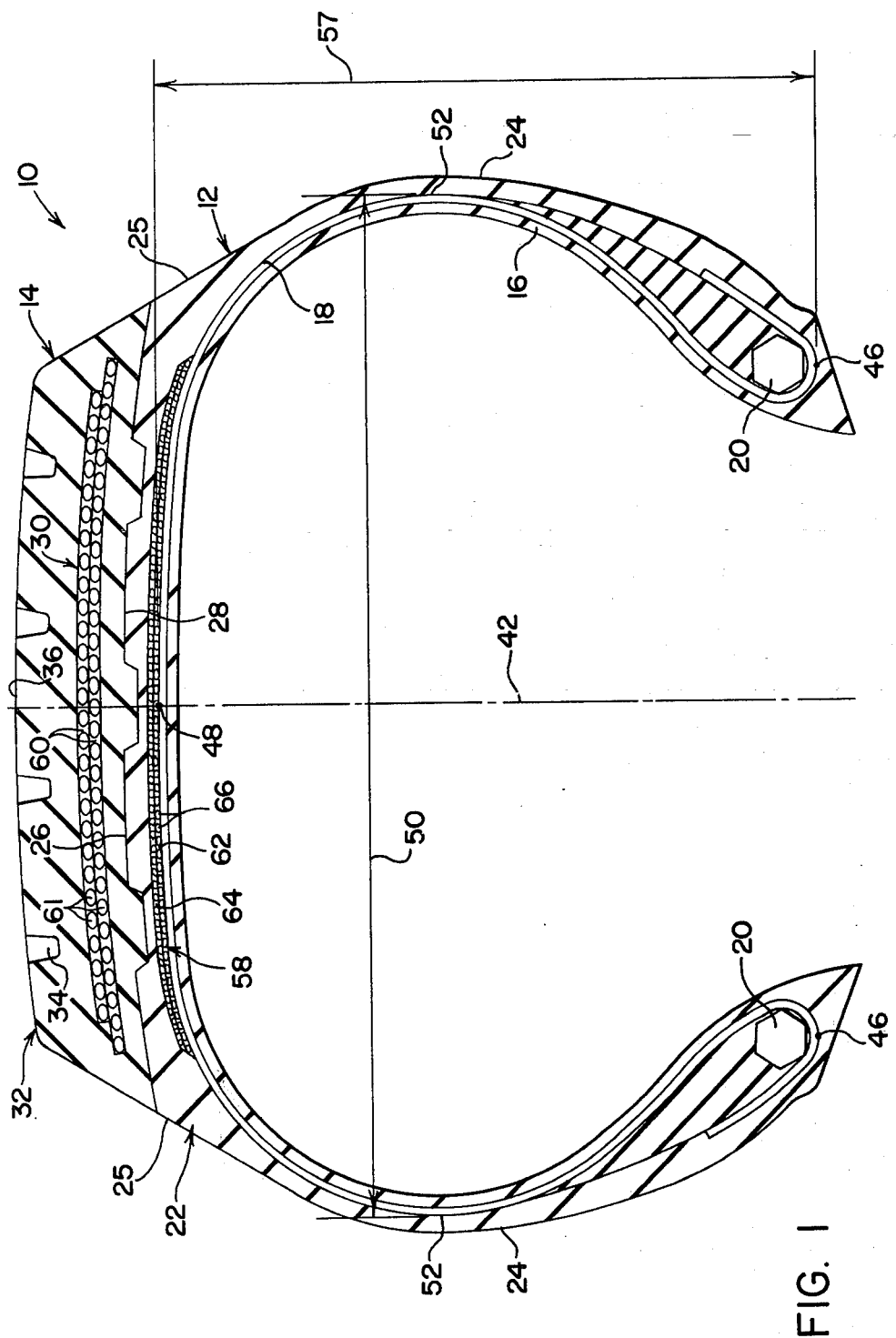
FIG. 1 is a partial cross-sectional view taken in a radial plane of a tire carcass and replaceable tread belt made in accordance with this invention, a radial plane being one which contains the axis of rotation of a tire.

With reference to FIG. 1, there is shown a pneumatic radial tire 10 under normal inflation pressure having a radial carcass 12 and a replaceable tread belt 14. "Normal inflation pressure" is that pressure within the normal inflation pressure range of which a tire is designed for normal use.

The tire carcass 12 is a generally toroidal body of resilient material having a fluid-impervious innerliner 16 of elastomeric material and at least one carcass play 18 of fabric embedded in elastomeric material such as rubber or urethane. The ply 18 has a plurality of generally parallel cords 19, as shown in FIG. 4, made of rayon, nylon, polyester, aramid, or steel, or any other suitable material consistent with good engineering design. The ply 18 extends between a pair of inextensible generally circular beads 20 to provide a toroidal form having a circumferentially extending crown portion 22 positioned axially centrally thereof and sidewalls 24 extending radially inward from respective axially outer edges 25 of the crown portion to the respective beads.

The term "axially", for the purposes of this specification and the claims, refers to a direction parallel to the axis of rotation of the tire 10. The axis of rotation of the tire 10 is the axis about which the tire normally rotates. The term "radially", for the purposes of this specification and the claims, refers to a direction perpendicular to the axis of rotation of the tire.

The crown portion 22 has a radially outer surface 26 which engages the replaceable tread belt 14 along a radially inner surface 28 of the belt. The tread belt 14 may be in the form of a circumferentially extending band of elastomeric material, such as rubber or urethane reinforced with a substantially inextensible belt structure 30. A tread 32 of the tread belt 14 is disposed radially outward of the belt structure 30 and may have a tread pattern 34 at a radially outer surface 36 for engaging the ground.

As shown in FIG. 2, the radial carcass 12 may be conventionally built in a generally cylindrical form on a cylindrical tire building drum 38 by applying the innerliner 16 followed by one or more carcass plies 18 extending between the beads 20. Cords 19 of the carcass ply 18 extend at an angle substantially perpendicular to the beads 20. Additional material may also be added to provide the surface 26 for engaging the tread belt 14.

The radial carcass 12, for the purposes of this description and the claims, is one in which cord angle 27 of each of the cords 19 of carcass ply 18 is between 75° and 90° as shown in FIG. 4. Preferably, this cord angle 27 is about 90°. The cord angle is the angle which the cords of a ply of fabric form with a midcircumferential centerline of the ply. The midcircumferential centerline of a ply is the line of intersection of the midcircumferential plane 42 of the carcass 12 with the ply. Carcass ply 18 has a midcircumferential centerline 41 as shown in FIG. 4. The midcircumferential plane 42 of the carcass 12 is a plane extending at right angles to the axis of rotation of the carcass and which passes midway between axially outermost points 52 of the outermost ply.

The tire carcass 12 and replaceable tread belt 14 may be manufactured separately. A major function of the belt structure 30 is to restrain the expansion of the carcass 12 during normal operation to provide a particular aspect ratio for which the carcass 12 is designed. The aspect ratio, for the purposes of this specification and claims, is the ratio between section height and section width 50 of the tire 10. The section height, for the purposes of this specification and the claims, is defined as the distance taken in a radial plane of the tire carcass 12 between a radially innermost point 46 and a radially outermost point 48 of the carcass plies 18. The section width 50 is the distance between axially outermost points 52 of the carcass ply 18.

It is a natural condition of an inflated radial tire carcass to assume an aspect ratio of about 1.06 if unrestrained. But if a tire carcass is designed for such an aspect ratio, then during normal operation, the inflation pressure will not be adequate to press the outer surface against the belt structure, especially if the belt structure is removable. Therefore the tire carcass 12, as shown in FIG. 1, is designed to have a predetermined section height 57 corresponding to an aspect ratio substantially less than 1.06, such as 0.60 to 0.80. The carcass 12, as shown in FIG. 1, is under normal inflation pressure.

As shown in FIG. 3, the tire carcass 12 positioned within a two-piece mold 54 for vulcanization has a toroidal shape with a section height 44 which is smaller than predetermined section height 57. The two-piece mold 54 has two sections 55 and 56 which engage each other at or near the midcircumferential plane 42 of the carcass. The two sections 55 and 56 of the mold 54 are brought together and in surrounding relation with the tire carcass 12 which is then fully shaped within the mold and cured.

As shown in FIG. 2, an annular unstressed restricting member 58 is placed circumferentially around the carcass 12 while it is in cylindrical shape. The physical characteristics of this member 58 are such that it will allow shaping of the carcass 12 to the generally toroidal shape having a section height 44, as shown in FIG. 3, which is less than the predetermined section height 57, as shown in FIG. 1, for which the carcass is designed as long as only a predetermined low shaping pressure such as five to seven pounds per square inch (0.35 to 0.49 kg/cm$^2$) is applied to the carcass. This much pressure is usually the minimum pressure needed to eliminate trapped air between the carcass and curing bladder. The maximum shaping pressure is usually about fifteen pounds per square inch (1.05 kg/cm$^2$) but can be of any amount less than normal inflation pressure as long as it is less than the pressure that would be required to expand the carcass beyond the predetermined section height 57. Without the restricting member 58 or any other restriction and with just minimal shaping pressure, the carcass 12 would expand until its section height corresponded to an aspect ratio of about 1.06. In such a case, the carcass 12 could not be enveloped by the mold 54 for vulcanization thereof.

The physical characteristics of the restricting member 58 are preferably such that the normal inflation pressure of the carcass 12 will expand the restricting member to permit the carcass to expand such that its section height is greater than the predetermined section height 57 when the tread belt 14 is not mounted on the carcass. Otherwise when the tread belt 14 is mounted on the carcass, the normal inflation pressure would still provide forces urging the restricting member 58 radially outward but not necessarily against tread belt 14 resulting in unsatisfactory engagement of the carcass 12 with the tread belt.

Thus, the carcass 12 does not normally include any belts or other restricting means which restrict the expansion of the carcass beyond the predetermined section height 57 when a pressure within the normal operating pressure range of the tire 10 is applied. The restricting member 58 can be made of any suitable material, have any suitable number of reinforcing plies, be of any suitable width, and be of any configuration within the bounds of good engineering practice as long as it has the physical characteristics described above.

In the preferred embodiment of this invention, the belt structure 30 of the replaceable tread belt 14 has two superimposed belt plies 60, each of which is reinforced with generally parallel steel cords 61 with a cord angle (not shown) of from 0° to 24° relative to the midcircumferential plane 42. The cords 61 of one of the belt plies 60 extend in an opposed direction to the cords in the other one of the belt plies. The belt structure 30 need not be limited to this embodiment, however. The cords 61 may be made of any suitable material and there may be more or less than two plies having different cord angles as long as the belt structure 30 is made in accordance with good engineering practice.

In the preferred embodiment of this invention, the restricting member 58 has a first restrictive band ply 62 and a second restrictive band ply 64 disposed in overlapping relation. Band ply 62 and band ply 64 have generally parallel reinforcing cords 66 describing equal but opposite cord angles 68 when wrapped around the carcass 12. Band ply 62 has a midcircumferential centerline 63 and band ply 64 has a midcircumferential centerline 65 as shown in FIG. 4.

The cord angles 68 of the restrictive band ply cords 66 are selected so that the cords will pantograph and allow shaping of the carcass 12 when the predetermined shaping pressure is applied to the carcass. "Pantographing" occurs when the plies 62 and 64 become longer and narrower and the cord angles 68 decrease as the tire carcass 12 is expanded to toroidal shape. The cord angles 68 are further selected so that the restrictive band plies 62 and 64 will resist expansion of the carcass 12 to a shape having a section height greater than the predetermined section height 57 when the predetermined section pressure is applied to the carcass.

The selection of a particular restricting member construction for a particular tire in accordance with this invention may be made by applying engineering principles known to those having ordinary skill in the art. For example, a restricting member 58 which has been found to be effective for building a tire carcass with an outside diameter of about 41 inches (104 cm) such as for a 11/75R24.5 truck tire has a pair of over-lapping restrictive band plies 62 and 64, each of which has a width axially of the carcass 12 of about 7.5 inches (19 cm) and a cord end count of 16 ends per inch. The cords 66 are of 840/2 nylon. The cord angle 68 of each ply 62 and 64 when the carcass 12 is in cylindrical form is approximately 42°. As the carcass 12 is shaped to the toroidal form for insertion in the mold 54 by applying preferably five to seven pounds per square inch (0.35 to 0.49 kg/cm$^2$) of shaping pressure, the cords 66 will pantograph resulting in each restrictive band ply 62 and 64 becoming longer and narrower until a cord angle 68 of approximately 28° to 30° results.

When the tire carcass 12 is expanded to the toroidal shape having a section height 44, as shown in FIG. 3, which is less than the predetermined section height 57, shown in FIG. 1, the restrictive band plies 62 and 64 provide sufficient resistance to limit further expansion of the carcass 12 as long as only the relatively low shaping pressure is being applied. When normal inflation pressure is applied to the carcass 12 and the carcass is not otherwise restrained such as by the mold 54 or by the inextensible tread belt 14, the cords of the restrictive band plies 62 and 64 will not have sufficient strength to prevent expansion of the carcass 12 beyond the predetermined section height 57, shown in FIG. 1.

Referring to FIGS. 2, 3 and 4, the radial tire 10 may be manufactured by the following method. The innerliner 16 is applied to the drum 38 followed by at least one radial ply 18 of reinforcing cords extending between a pair of beads 20. The annular restricting member 58 is then applied by wrapping it circumferentially around the carcass ply 18 generally in an unstressed condition. The innerliner 16, carcass ply 18, and restricting member 58 include elastomeric material surrounding the reinforcing cords and beads 20 to form a cylindrical carcass 12. A curing bladder 69 may be inserted in the carcass 12 which is then partially shaped to a generally toroidal shape having a section height 44, as shown in FIG. 3, which is less than the predetermined section height 57 shown in FIG. 1, by applying a predetermined shaping pressure to the carcass. The predetermined shaping pressure applied is less than the pressure required to expand the carcass 12 to the predetermined section height 57, shown in FIG. 1. The carcass 12 is then enclosed in the mold 54 after which additional pressure is applied to the carcass to complete the shaping of the carcass within the mold. The carcass 12 is then vulcanized in the mold 54. After the carcass 12 is removed from the mold 54, a replaceable tread belt 14 is mounted circumferentially about the carcass and normal inflation pressure is applied to the carcass to expand it into engagement with the tread belt 14.

While certain representative embodiments and details have been shown for the purpose of illustrating the invention, it will be apparent to those skilled in the art that various changes and modifications may be made therein without departing from the spirit or scope of the invention.

What is claimed is:
1. A method of making a radial tire carcass for a replaceable tread belt tire comprising:
   (a) building a generally cylindrical unvulcanized tire carcass of elastomeric material including a pair of beads and at least one radial ply of reinforcing cords extending between said beads;
   (b) wrapping a restricting member circumferentially around said carcass, the strength of said restricting member being such as to limit expansion of said carcass to a toroidal shape having a section height less than a predetermined section height of said tire in the molded condition when a predetermined shaping pressure is applied to said carcass;
   (c) partially shaping said carcass to a generally toroidal shape having a section height less than said predetermined section height by inflating said carcass at said predetermined shaping pressure;
   (d) enclosing a mold having two sections which engage each other at the mid-circumferential plane of the carcass about the partially shaped unvulcanized tire carcass;
   (e) applying pressure greater than said shaping pressure to the unvulcanized tire carcass within the mold to complete the shaping of the tire carcass to a shape having said predetermined section height within the mold, said restricting member having insufficient strength to prevent expansion of said carcass to a shape having a section height greater than said predetermined section height at the normal inflation pressure of the tire;

(f) vulcanizing the tire carcass in the mold; and (g) removing the tire carcass from the mold.

2. The method of claim 1, wherein said restricting member comprises a first restrictive band ply of reinforcing cords having a cord angle relative to the midcircumferential plane of said carcass when wrapped around said carcass, a second restrictive band ply of reinforcing cords in overlapping relation to said first restrictive band ply and having an equal but opposite cord angle relative to the cord angle of said cords of said first restrictive band ply when said second restrictive band ply is wrapped around said carcass, the method further comprises the step of positioning said cord angles of said restrictive band ply cords at angles such that said cords will pantograph to allow said shaping of said carcass when said predetermined shaping pressure is applied to said carcass so that said restrictive band plies will resist expansion of said tire carcass beyond said predetermined section height when said predetermined shaping pressure is applied to said carcass.

3. A method according to claim 2, wherein said carcass has an outside diameter of about 41 inches, said cords of said restrictive band plies are of 840/2 nylon, said restrictive band plies have a width axially of said carcass of about 7.5 inches and a cord end count of 16 ends per inch, said cord angles of said restrictive band plies are approximately 42° when the carcass is in cylindrical form, and said cord angles being approximately 29° after the carcass has been shaped and the cords pantographed upon inflation of said carcass to said predetermined shaping pressure.

4. A method according to claim 1, wherein said predetermined shaping pressure is between five and fifteen pounds per square inch.

5. A method according to claim 1, wherein said predetermined shaping pressure is less than the pressure required to expand the carcass to said predetermined section height.

* * * * *